(12) United States Patent
Kempf et al.

(10) Patent No.: US 11,288,051 B2
(45) Date of Patent: Mar. 29, 2022

(54) METHOD FOR ADAPTING FUNCTIONALITIES OF A FIELD DEVICE

(71) Applicant: Endress+Hauser Conducta GmbH+Co. KG, Gerlingen (DE)

(72) Inventors: Stefan Kempf, Kornwestheim (DE); Stefan Robl, Hünxe (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 16/590,914

(22) Filed: Oct. 2, 2019

(65) Prior Publication Data
US 2020/0104108 A1  Apr. 2, 2020

(30) Foreign Application Priority Data
Oct. 2, 2018  (DE) ...................... 10 2018 124 330.8

(51) Int. Cl.
*G06F 8/61* (2018.01)
*G06F 16/23* (2019.01)
(Continued)

(52) U.S. Cl.
CPC ............ *G06F 8/61* (2013.01); *G06F 16/2379* (2019.01); *G06F 16/252* (2019.01); *G06F 16/9566* (2019.01); *G07C 3/00* (2013.01)

(58) Field of Classification Search
USPC ........................................................ 717/177
See application file for complete search history.

(56) References Cited

U.S. PATENT DOCUMENTS 6,868,538 B1 * 3/2005 Nixon ................ G05B 23/0216
                                                                                       700/83
8,060,872 B2 * 11/2011 Da Silva Neto ... G05B 19/0426
                                                                                       717/177
(Continued)

FOREIGN PATENT DOCUMENTS

| CN | 101836188 A | 9/2010 |
|---|---|---|
| CN | 104956271 A | 9/2015 |

(Continued)

OTHER PUBLICATIONS

Brien Posey; "Building a Custom Windows 10 Image"; TechGenix.com website [full url in ref.]; May 1, 2017 (Year: 2017).*
(Continued)

*Primary Examiner* — Wei Y Zhen
*Assistant Examiner* — Clint Thatcher
(74) *Attorney, Agent, or Firm* — Kelly J. Smith; Endress+Hauser (USA) Holding Inc.

(57) ABSTRACT

The present disclosure includes a method for adapting functionalities of a field device, including a step of transmitting a configuration of the field device to a database. Further application programs, including additional functionality for the field device and basic programs for various field devices are stored on the database. The configuration of the field device has information about the basic program of the field device, any application programs already on the field device, the type of field device or the hardware of the field device. The method also includes a step of selecting a further application program. An installation package is created containing the further application program using a tool chain selected based on the configuration. The tool chain creates the installation package in a format executable on the field device. The installation packet is executed on the field (Continued)

device, thus transferring the further application program to the field device.

12 Claims, 3 Drawing Sheets

(51) Int. Cl.
*G07C 3/00* (2006.01)
*G06F 16/25* (2019.01)
*G06F 16/955* (2019.01)

(56) References Cited

U.S. PATENT DOCUMENTS

| | | | | |
|---|---|---|---|---|
| 8,555,273 | B1* | 10/2013 | Chia | G06F 8/654 |
| | | | | 717/173 |
| 2003/0204373 | A1* | 10/2003 | Zielinski | G05B 19/409 |
| | | | | 702/184 |
| 2003/0229472 | A1* | 12/2003 | Kantzes | G05B 19/409 |
| | | | | 702/183 |
| 2007/0124459 | A1* | 5/2007 | Kasama | G06F 8/61 |
| | | | | 709/224 |
| 2007/0150891 | A1* | 6/2007 | Shapiro | G06F 16/162 |
| | | | | 717/174 |
| 2009/0031296 | A1* | 1/2009 | Boudreau | H04L 67/04 |
| | | | | 717/174 |
| 2009/0132690 | A1* | 5/2009 | Hafez | G06Q 30/0603 |
| | | | | 709/223 |
| 2009/0138870 | A1 | 5/2009 | Shahindoust et al. | |
| 2013/0125107 | A1* | 5/2013 | Bandakka | G06F 11/1448 |
| | | | | 717/171 |
| 2015/0113423 | A1* | 4/2015 | Giango | G05B 19/0426 |
| | | | | 715/740 |
| 2017/0220404 | A1* | 8/2017 | Polar Seminario | G06F 11/0736 |
| 2018/0081660 | A1* | 3/2018 | Chan | G06F 21/51 |
| 2018/0225127 | A1* | 8/2018 | Nulman | G06F 21/54 |
| 2020/0012488 | A1* | 1/2020 | Koval | G06F 8/71 |

FOREIGN PATENT DOCUMENTS

| | | |
|---|---|---|
| CN | 105100191 A | 11/2015 |
| CN | 107643734 A | 1/2018 |
| DE | 102010029952 A1 | 12/2011 |
| DE | 102012112842 A1 | 6/2014 |
| EP | 2541396 A2 | 1/2013 |
| GB | 2554969 A | 4/2018 |

OTHER PUBLICATIONS

Bryan Clark; "Skip iTunes Entirely and Browse Apple's Mobile App Store from the Browser"; TheNextWeb.com website [full url in ref .]; Aug. 30, 2018 (Year: 2018).*

Wang et al.; "An Object-Oriented Reconfigurable Software"; Modern Industrial Automation Software Design, IEEE (pp. 93-149); 2006 (Year: 2006).*

* cited by examiner

METHOD FOR ADAPTING FUNCTIONALITIES OF A FIELD DEVICE

CROSS-REFERENCE TO RELATED APPLICATION

The present application is related to and claims the priority benefit of German Patent Application No. 10 2018 124 330.8, filed on Oct. 2, 2018, the entire contents of which are incorporated herein by reference.

TECHNICAL FIELD

The present disclosure relates to a method for adapting functionalities of a field device, wherein the field device has and executes a basic program, such as a firmware, and optionally at least one application program, wherein the basic program contains a basic functionality of the field device and wherein the application program contains an additional functionality of the field device.

Field devices that are used in industrial installations are already known from the prior art. Field devices are often used in process automation, as well as in manufacturing automation. Field devices, in general, refer to all devices which are process-oriented and which supply or process process-relevant information. Field devices are thus used for detecting and/or influencing process variables. Measuring devices, or sensors, are used for detecting process variables. These are used, for example, for pressure and temperature measurement, conductivity measurement, flow measurement, pH measurement, fill-level measurement, etc., and to detect the corresponding process variables of pressure, temperature, conductivity, pH value, fill-level, flow, etc. Actuators are used for influencing process variables. These are, for example, pumps or valves that can influence the flow of a fluid in a pipe or the fill-level in a tank. In addition to the aforementioned measuring devices and actuators, field devices are also understood to include remote I/O's, radio adapters, or, generally, devices that are arranged at the field level.

A variety of such field devices is produced and marketed by the Endress+Hauser Group.

Today's field devices consist of a permanently installed software functionality, which can only be expanded by updates from the manufacturer and requires a complete update of the field device. This structure proves to be increasingly inflexible. If, for example, the field device is to support a new type of sensor, the above-mentioned complete update is necessary. In addition, the operation of the software of a field device is constructed generically in order to be able to cover many industries and applications with one software. This makes sense from a manufacturer's point of view, since a uniform software for all industries means less development work than software that is specifically customized in each case. However, this approach is less practical from a customer perspective, since the software has controls which for many customers are not relevant. In this case, a software and user interface containing only those elements relevant to the customer application would be desirable. This increases productivity for the customer (for example due to less effort required for familiarization) and reduces the risk of faulty operation.

The software installed on modern computer systems (e. g. desktop PCs and laptop PCs, servers, cellular phones and tablet PCs) is divided into a powerful, complex general purpose operating system with general functionality (e. g. network connections, file access) and applications (installable at any time). This division makes it possible to add new functionality in a simple manner. On a small embedded system, a general purpose operating system with separate applications uses too many resources. On such a small embedded system, the operating system and applications instead form an unchangeable permanently connected unit.

Virtual machines are an alternative to the division into operating system and applications. Said machines execute programs that are in a hardware-independent byte code format. However, the implementation of a virtual machine causes efficiency losses in comparison with a native execution of the applications. Thus, this concept is also not very suitable for small embedded systems or can only be implemented with considerable effort. However, this hardware independence is urgently needed for field device applications. Field devices are durable products and it is to be assumed that software extensions will be subject to similarly long life cycles. However, it has now become possible for field devices to be developed on the basis of new hardware platforms. Existing software extensions should also be able to be used on these new platforms.

SUMMARY

The present disclosure relates to providing a method which allows a field device to be expanded by one or more functionalities without the use of virtual machines or the use of a complex operating system being necessary.

The object is achieved by a method for adapting functionalities of a field device, wherein the field device has and executes a basic program, such as a firmware, and, optionally, at least one application program. The basic program includes a basic functionality of the field device, and the application program includes an additional functionality of the field device.

The method includes a step of transmitting a configuration of the field device to a database, which may be integrated into a cloud-enabled system. A plurality of further application programs, each of which contain at least one additional functionality for the field device, and a plurality of basic programs for different types of field devices are stored on the database. The configuration of the field device has information about the basic program of the field device, about any application programs already located on the field device, about the type of field device and/or about the hardware of the field device. The further application programs are present in a common data format, such as source code or a platform-independent byte code. The basic programs are in the same data format as the application programs or in a format already tailored to the field device, such as relocatable object code.

The method also includes steps of selecting at least one further application program and creating an installation package containing the selected further application program by a tool chain, such as a compiler and/or a linker, selected on the basis of the transmitted configuration of the field device. The tool chain creates the installation package in a format executable on the field device. The installation package is transmitted to the field device and executed such that the further application program is transferred to the field device.

According to the present disclosure, a field device can be expanded in a simple manner by additional functionalities. A plurality of additional application programs for field devices may be stored on a cloud-enabled database which interacts with an application, such as, for example, an app store. Such an application program, which is intended to extend the functionality of the field device, may be encoded into an installation package that can be executed on the field device. For coding, a tool chain, such as a compiler, may be used, which is selected by the cloud-enabled database on the basis of the configuration transmitted by the field device. By executing the installation package on the field device, the further application program is installed on the field device, whereupon the additional functionality is available on said field device.

A cloud-enabled system is an integrated system compatible with centralized or distributed cloud computing technology. The system contains at least the database and the program logic necessary for implementing the method according to the present disclosure outside the field device. In this case, cloud computing is understood to mean storing information and accessing the stored information via the Internet.

Examples of field devices that are described in connection with the method according to the present disclosure have already been described in the introductory part of the description.

In an further development of the method according to the present disclosure, it is provided that the basic program matching the type of field device is contained in the installation package in addition to the application program, and the basic program already present on the field device and any application programs already installed on the field device are overwritten with the basic program and application program included in the installation package by executing the installation package on the field device. This particular method variant of assembling the installation package is referred to as "static binding".

An embodiment of the method according to the present disclosure provides that the application programs already located on the field device are additionally contained in the installation package. Since the complete software of a field device is generally overwritten by executing an installation package created by the static binding, this embodiment of the method ensures that the complete software, which was available on the field device before the execution of the method, is also available after the execution of the installation package, including the selected additional application program.

Another embodiment of the method according to the present disclosure provides that to uninstall an application program an installation package is created, which contains the basic program of the field device and all application programs contained on the field device, apart from the application program to be installed, wherein by executing this installation package on the field device, the basic program already present on the field device and the application programs already present on the field device are overwritten with the basic program and application program contained in the installation package.

In another embodiment of the method according to the present disclosure, it is provided that the created installation packages or parts of the created installation packages are stored on the database. By such a so-called "caching", installation packages once created can be reused, for example for the field device for which it was created (for example for the purpose of reinstalling the software) or for a further field device having the same configuration. Storing takes place in a cache of the database.

In a first variant of the method according to the present disclosure, it is provided that the field device is in communication with the database via a communication network, for example the Internet, and wherein the field device transmits the configuration to the database via the communication network and/or wherein the database transmits the installation package to the field device via the communication network.

In a second variant of the method according to the present disclosure, it is provided that the configuration of the field device is transmitted to a storage medium or to an operating device, and wherein the storage medium or the operating device transmits the configuration to the database. Such a storage medium is, for example, a memory card or a USB stick. The operating device is, for example, an operating unit in the sense of the "Field Xpert", which is produced and sold by Applicant, a laptop or a mobile terminal, such as a smartphone or a tablet PC.

An embodiment of the second variant of the method according to the present disclosure provides that the installation package is transmitted to the storage medium or to the operating unit, and wherein the installation package is transmitted from the storage medium or from the operating unit to the field device.

In another embodiment of the method according to the present disclosure, it is provided that a measuring transducer is used as the field device, to which measuring transducer at least one sensor element can be connected. The measuring transducer can also be part of the field device or a component of the field device. A measuring transducer, also referred to as a transmitter, is a device that converts an input variable into an output variable according to a fixed relationship. In process automation technology, a sensor element, for example, is connected to a measuring transducer. The raw measured values of the sensor element are processed in the measuring transducer, e.g., averaged or converted by means of a calibration model to another variable, such as the process variable to be determined and possibly transmitted to a control system, for example.

Generally, a cable for connection to the sensor element is connected to the measuring transducer. The measuring transducer is in this case a separate device with a separate housing and various interfaces. Alternatively, the measuring transducer can be integrated, e.g., in the form of a circuit such as a microcontroller, into a cable or directly into a plug connection.

The connection of the cable to the sensor element is frequently accomplished via a plug connection, e.g., by galvanically decoupled, such as inductive, interfaces. Thus, electrical signals can be transmitted contactlessly. Advantages with regard to corrosion protection, electrical isolation, prevention of mechanical wear of the plug, etc., are shown by this galvanic isolation. Applicant markets such systems under the name, "Memosens."

The most varied sensor elements can be connected to the measuring transducer. Under the aforementioned name, "Memosens," Applicant markets sensor elements for measuring pH value, conductivity, oxygen, turbidity, and others.

In another embodiment of the method according to the present disclosure, it is provided that at least one of the following additional functionalities of the measuring transducer is contained in the further application program: driver packages for the sensor element to be connected; processing measured values of physical measurands of the sensor; and menu structures.

Each of these sensor elements may require specific software from the measuring transducer. A corresponding device driver may be kept available in the measuring transducer. Such a device driver can be loaded onto the field device as part of a driver package in the form of the additional application program.

In an aspect of the method according to the present disclosure, it is provided that a user accesses a website of the database and performs the selection of the at least one further application program by means of the website.

In another embodiment of the method according to the present disclosure, it is provided that the database has an interface, wherein a program accesses the database via the interface and performs the selection of the at least one further application program.

In another embodiment of the method according to the present disclosure, it is provided that the method is initiated by connecting a sensor to the field device, wherein the sensor has an identifier of the at least one further application program to be selected and transmits it to the field device, and the measuring transducer transmits the identifier to the database for the purpose of selecting the further application program. In particular, it is necessary for this purpose for the field device to be in communication with the database via a communication network.

BRIEF DESCRIPTION OF THE DRAWINGS

The present disclosure is explained in greater detail with reference to the following figures. These show.

DETAILED DESCRIPTION

Figure 1:
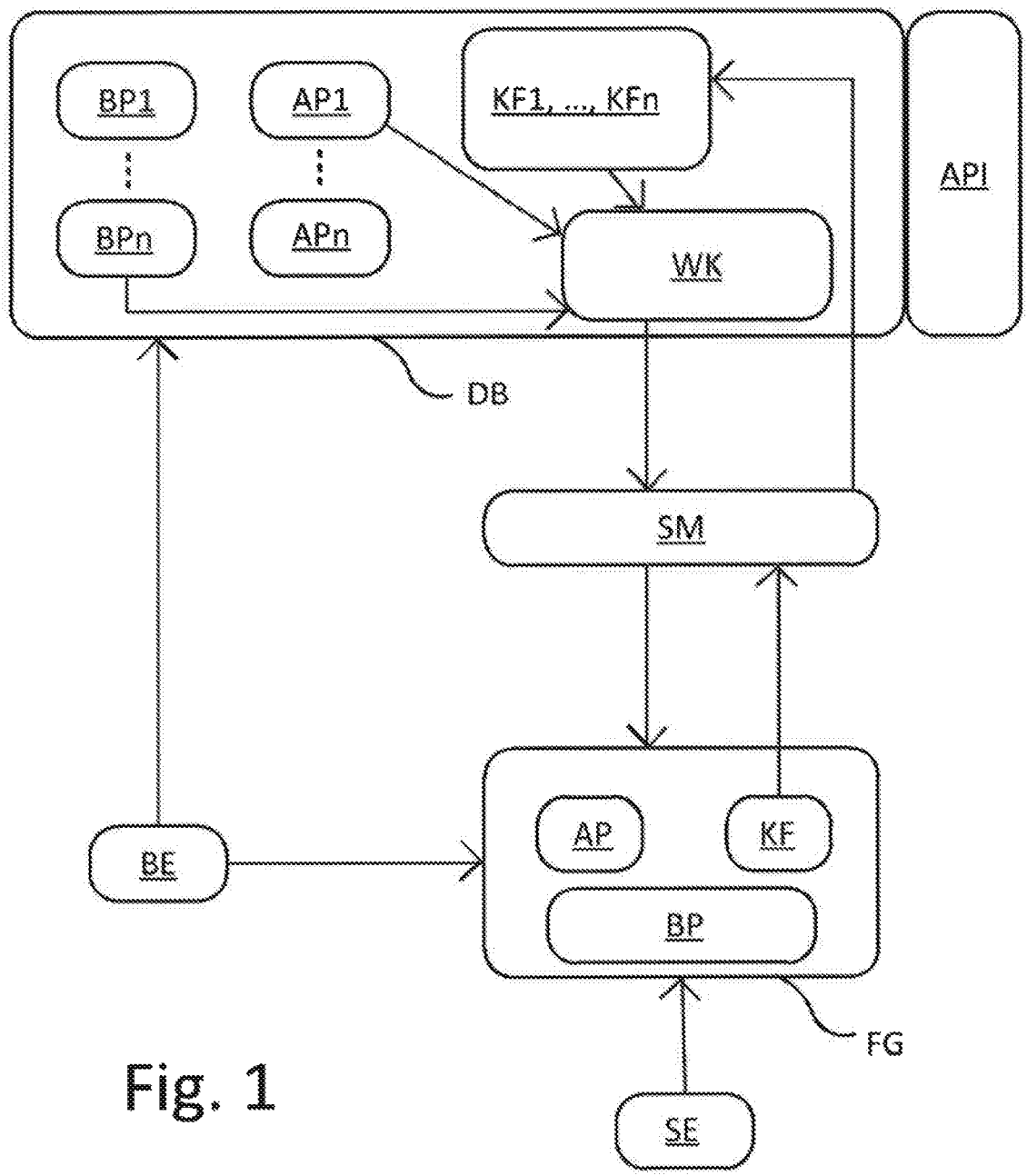
FIG. 1 shows a schematic overview of the method according to the present disclosure.

FIG. 1 shows a complete overview of the method according to the present disclosure. As shown, application programs AP1, . . . , APn are present on a database DB separate from a field device FG in a portable code (for example a source code or a byte code), which is independent of a specific field device hardware. The basic programs BP1, . . . , BPn of all field device models are also present on the database DB, for example, as source code, hardware-independent byte code or as relocatable object code already tailored to the field device FG. If a user BE or the field device FG itself requests the installation of a new application program AP1, . . . , APn, an installation package IP able to run on the specific destination field device FG is generated from the corresponding portable code. For this purpose, the creation of the installation package prefers that the specific configuration KF of the target measuring transducer is known. This comprises not only the type of field device FG and/or information about the hardware of the field device FG, but also, for example, the specifically used basic program of the field device and/or application programs AP1, . . . , APn already installed on the field device FG.

For this purpose, the field device FG transmits its configuration to the database DB. This can be done, for example, by providing a communication link via a communication network between the database DB and the field device FG.

However, communication links between field devices FG and systems outside the corporate network are frequently suppressed. Alternatively, a storage medium SM or an operating unit is therefore used in the method according to the present disclosure. The user BE instructs the field device FG to store its configuration KF on the storage medium SM or on the operating unit and transmits from there the configuration KF to the app store.

Data transmission of the installation packages from the database DB to the field device FG also occurs. Here as well, a possible missing direct connection between the database DB and the field device FG has to be bridged by a data switcher in the form of the storage medium or the operating unit.

After the transmission has been carried out, the installation package is installed on the field device FG, so that the further application program AP1, . . . , APn can subsequently be executed.

In the following, the details of the creation and execution of the installation package IP will be explained. The specific implementation of the creation of the installation package IP depends on how its installation is to take place. When the installation package IP is executed, the further application program AP1, . . . , APn is connected to the basic program BP of the field device and possibly any additional already installed application programs AP. Two fundamentally different concepts are used for this purpose: static binding and dynamic binding.

Figure 2:
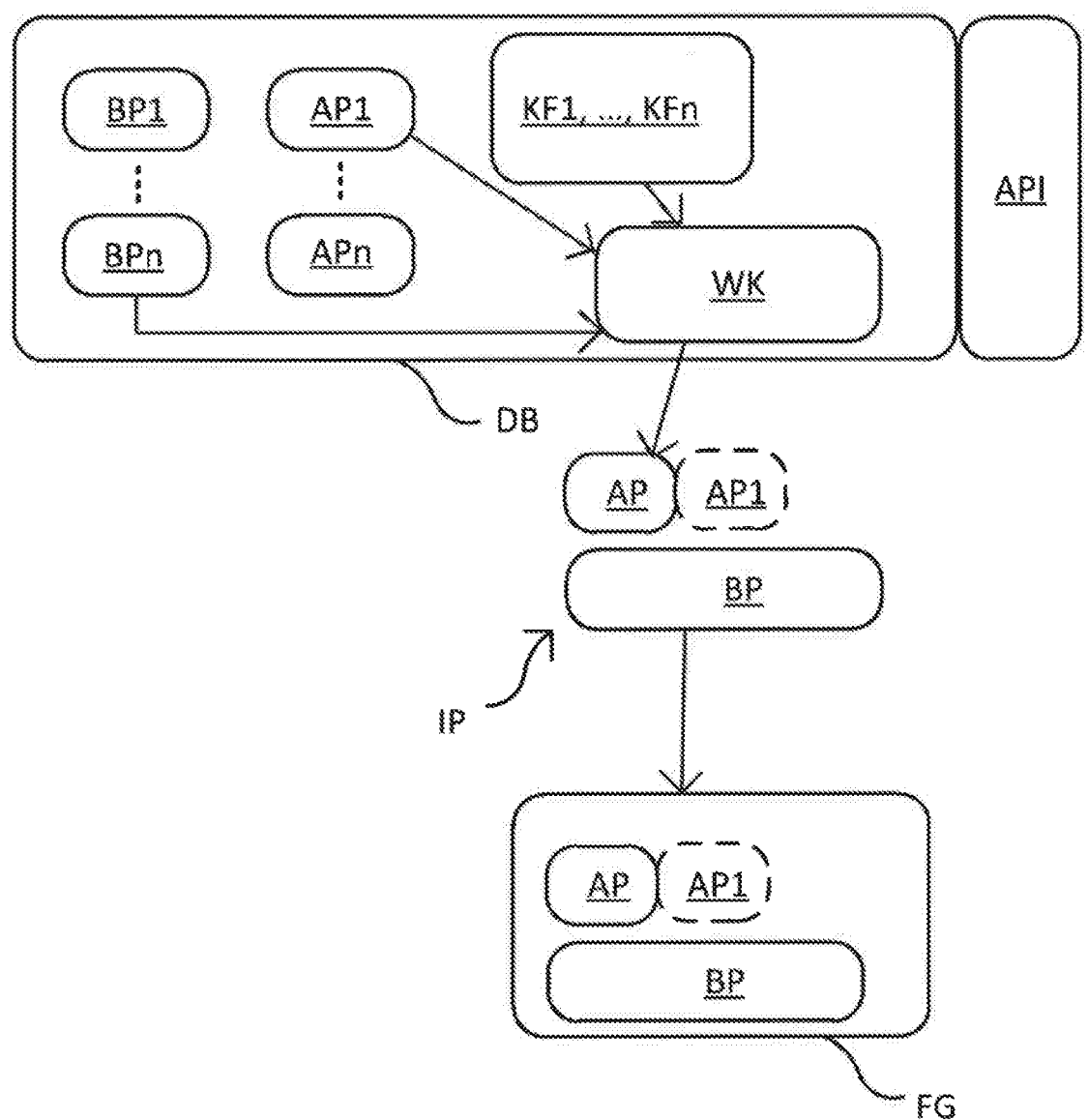
FIG. 2 shows a first exemplary embodiment for creating an installation package.

FIG. 2 shows the creation of the installation package and the installation of the further application program AP1, . . . , APn by means of static binding. FIG. 2 shows schematically the creation and transmission of the installation package. The basic structure and the transmission correspond to those from FIG. 1. For the sake of clarity, various elements shown in FIG. 1 (for example, sensor element SE, user BE and storage medium SM) are not shown. Nevertheless, these elements may be present and provided.

In static binding, the application programs AP, AP1, . . . , APn and the basic program BP of the field device are firmly interconnected to form an installation package. The static binding takes place on the database DB. For this purpose, the code of the selected further application program AP1, . . . , APn, the basic program of the field device FG, as well as application programs AP already installed beforehand on the field device FG are recompiled to form the installation package IP and then transmitted to the field device FG.

One possible compilation method includes compiling the basic program BP and the application programs AP1, . . . , APn, existing as source code, into a program. Another possible compilation method includes having the basic program BP present as relocatable object code and having the application programs AP1, . . . , APn present as source code. The application programs AP1, . . . , APn are compiled by a compiler, and the compiled application programs AP1, . . . , APn and the relocatable object code of the basic program BP are combined using a linker to form a program.

The transmission can take place, for example, as delta to the software AP, BP previously installed on the field device FG. Subsequently, the field device performs a complete update and installs the application programs AP, AP1, . . . , APn located in the installation package IP, as well as the basic program.

The compilation process on the database can at the same time still be optimized by buffering interim results of the compilation in a cache of the database DB. If, for example, two field devices with the same configuration request the same further application program AP1, . . . , APn, only a compilation to an installation package IP is necessary when using a cache, provided that the installation package IP is still in the cache as a result of the first compilation.

The uninstalling of an application program AP, AP1, . . . , APn can be effected in a similar manner. To uninstall an application AP, AP1, . . . , APn, only the basic program BP, as well as all application programs previously installed, with the exception of the application program AP, AP1, . . . , APn that is to be uninstalled, are compiled to form an installation package. This installation package is transmitted again to the specific field device FG. The creation of the installation package IP by the static binding has the following advantage: the field device FG only has the task of installing the new image. However, since a completely new software BP, AP1, . . . , APn is installed, a restart of the field device is generally necessary. An alternative here is the creation of the installation package IP by means of dynamic binding.

Figure 3:
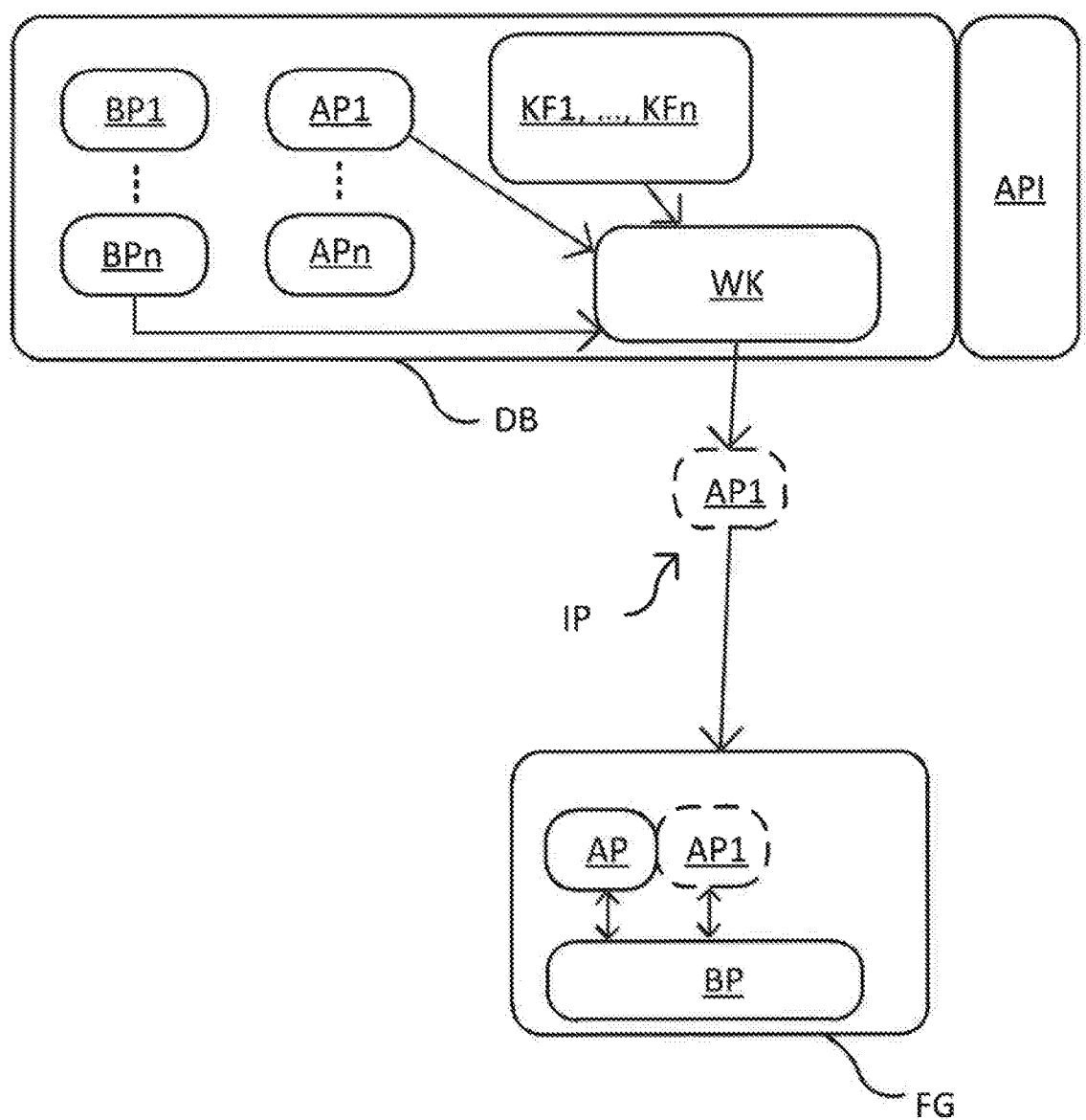
FIG. 3 shows a second exemplary embodiment for creating an installation package.

FIG. 3 shows the creation of the installation package IP and the installation of the further application program AP1, . . . , APn by means of dynamic binding. FIG. 2 shows schematically the creation and transmission of the installation package. The basic structure and the transmission correspond to those from FIG. 1. For the sake of clarity, various elements shown in FIG. 1 (for example, sensor element SE, user BE and storage medium SM) are not shown. Nevertheless, these elements may be present and provided.

Instead of generating a complete installation package IP, which also contains the basic program BP of the field device FG, the database compiles the code of the selected further application program AP1, . . . , APn into an installation package IP in the form of a dynamic library. The database now only transmits the generated dynamic library. Subsequently, a dynamic linker on the field device can dynamically load or remove this information. This does not require a restart of the field device. However, a dynamic linker requires that both the basic program and the installation package contain IP symbol information. This is used to resolve references from the dynamic library to the basic program BP. However, symbols need space which may not be available on a very small embedded system that is present on the field device FG.

The arrow from BPn to WK is optional in FIG. 3, since the dynamic library can be created solely from the source code of the applications AP1, . . . , APn. However, it may be helpful to also provide the basic program BP to the tool chain WK. For example, a tool chain WK can thereby check in advance that the dynamic library generated from an application program AP only references symbols present in the basic program BP. Thus, it can be identified in advance whether the dynamic linker on the field device FG can install the application program AP.

The cache treated in the context of FIG. 2 can also be used on the database: If two field devices FG with the same configuration request the same further application program AP1, . . . , APn, a recompilation can be avoided if the installation package has already been generated and is in the cache.

A further advantage of dynamic libraries is that the database does not need any information about which application programs AP are already installed on the field device FG, since dynamic libraries can be positioned independently of already installed application programs.

It can be provided that a measuring transducer is used as field device FG or that the measuring transducer is part of field device FG. Generally speaking, a measuring transducer, also called a transmitter, is a device that converts an input variable into an output variable according to a fixed relationship. In process automation technology, a sensor element SE is connected to a measuring transducer. Such a sensor element SE requires a specific application program from the measuring transducer. A corresponding device driver should be kept alive in at least the measuring transducer. Such a device driver can be loaded onto the measuring transducer as part of a driver package in the form of the additional application program AP1, . . . , APn.

The invention claimed is:

1. A method for adapting functionalities of a field device, wherein the field device includes and executes a basic program and at least one application program, wherein the basic program, which is firmware of the field device, contains a basic functionality of the field device and wherein the at least one application program contains an additional functionality of the field device, comprising:
   transmitting a configuration of the field device to a database,
   wherein a plurality of further application programs, each of which includes at least one additional functionality for the field device and a plurality of other basic programs for different types of field devices are stored on the database,
   wherein the configuration of the field device includes information about the basic program of the field device, about any application programs already located on the field device, about the type of field device and/or about the hardware of the field device,
   wherein the further application programs are present in a common data format and wherein the other basic programs are in a same data format as the further application programs or in a format tailored to the field device;
   selecting at least one further application program;
   creating an installation package containing the selected at least one further application program using a tool chain selected based on the transmitted configuration of the field device, wherein the tool chain creates the installation package in a format executable on the field device;
   transmitting the installation package to the field device and executing the installation package to install the at least one further application program on the field device;
   storing the installation package in the database; and
   installing or reinstalling the installation package on a different field device,
   wherein the field device and the different field device have the same configuration, and wherein the field device and the different field device have different basic programs,
   wherein a further basic program of the other basic programs, which is configured for the type of field device, is included in the installation package in addition to the at least one further application program, and
   wherein by executing the installation package on the field device, the basic program of the field device and any application programs already located on the field device are overwritten with the further basic program and the at least one further application program included in the installation package.

2. The method of claim 1, wherein the application programs already on the field device are additionally contained in the installation package.

3. The method of claim 1, wherein the installation package is created to uninstall an application program, wherein the installation package includes the basic program of the field device and all application programs contained on the field device excluding the application program to be uninstalled, wherein by executing the installation package on the field device the basic program already contained on the field device and the application programs already contained on the field device are overwritten with the basic program and application programs contained on the installation package.

4. The method of claim 1, wherein parts of the installation package are stored on the database.

5. The method of claim 1, wherein the field device is in communication with the database via a communication network and wherein the field device transmits the configuration via the communication network to the database or the database transmits the installation package to the field device via the communication network.

6. The method of claim 1, wherein the configuration of the field device is transmitted to a storage medium or to an operating unit and wherein the storage medium or the operating unit transmits the configuration to the database.

7. The method of claim 6, wherein the installation package is transmitted to the storage medium or to the operating unit and wherein the installation package is transmitted by the storage medium or by the operating unit to the field device.

8. The method of claim 1, wherein the field device is a measuring transducer, wherein at least one sensor element is connectable to the measuring transducer.

9. The method of claim 8, wherein the at least one further application program contains driver packets for connecting the sensor element to the measuring transducer, functionality to process measured values of physical measurands of the sensor element, or menu structures.

10. The method of claim 1, wherein a user accesses a website of the database and uses the website to select the at least one further application program.

11. The method of claim 1, wherein the database includes an interface, wherein a program accesses the database via the interface and performs the selection of the at least one further application program.

12. The method of claim 11, wherein the method is initiated by connecting a sensor element to the field device, wherein the sensor element includes an identifier of the at least one further application program to be selected and transmits the identifier to the field device, and wherein the field device transmits the identifier to the database for the purpose of selecting the at least one further application program.

\* \* \* \* \*